United States Patent [19]

Streat et al.

[11] Patent Number: 4,711,863
[45] Date of Patent: Dec. 8, 1987

[54] IMMOBILIZED EXTRACTANTS

[75] Inventors: Michael Streat, Wembley, England; Sofia Belfer-Canterman, Beer-Sheva, Israel

[73] Assignee: National Research Development Corporation, England

[21] Appl. No.: 838,298

[22] Filed: Mar. 10, 1986

[30] Foreign Application Priority Data

Mar. 12, 1985 [GB] United Kingdom ................ 8506335

[51] Int. Cl.$^4$ .................. B01J 37/34; B01J 20/26; B05D 3/06; C08J 5/24
[52] U.S. Cl. .................................. 502/5; 210/656; 252/184; 427/36; 427/44; 502/402; 522/71; 522/76; 522/78; 522/81
[58] Field of Search ............... 502/5, 402, 159; 427/36, 44; 423/658.5; 210/656; 522/71, 76–83; 252/184

[56] References Cited

U.S. PATENT DOCUMENTS

| 3,813,347 | 5/1974 | Hayes | 502/402 |
| 3,960,762 | 6/1976 | Kroebel et al. | 502/402 |
| 4,045,353 | 8/1977 | Kosaka et al. | 502/402 |
| 4,130,512 | 12/1978 | Streat | 526/72 |
| 4,500,494 | 2/1985 | Scher | 423/658.5 |

Primary Examiner—P. E. Konopka
Attorney, Agent, or Firm—Jacobs & Jacobs

[57] ABSTRACT

A process for the production of a solid, particulate immobilized extractant, which process comprises adsorbing (a) a liquid extractant which is not homopolymerizable onto (b) a porous, solid, particulate, substrate; adsorbing (c) a monomer onto the substrate; and polymerizing the adsorbed monomer (c) thereby entrapping the liquid extractant (a) on substrate (b).

14 Claims, 3 Drawing Figures

IMMOBILIZED EXTRACTANTS

This invention relates to immobilised extractants; to processes for their preparation; and to methods of extraction using such materials. More particularly, this invention relates to solid, particulate liquid extractants having proven capacity, selectivity and good extraction kinetics.

In our GB No. 1,456,974 we have disclosed a stepwise process for the production of a particulate ion-exchange material, which process comprises heating a particulate inorganic material to a temperature from 100° to 550° C. to produce a porous inert inorganic substrate; subsequently adsorbing an organic monomer into the substrate; and polymerising the adsorbed monomer so that the resultant polymer is retained within the pores of the substrate; and, if necessary, introducing ion-exchange functional groups into the polymer. We have also disclosed the ion-exchange material so produced and its use in methods of extraction. Such materials have subsequently been found to have relatively low capacity and also relatively poor selectivity for most hydrometallurgical applications.

It is also known (see, for example, U.S. Pat. No. 3,960,762) to prepare ion-exchange materials in which organic ion-exchange reagents are incorporated into a vinyl monomer suspension polymerisation charge which is then polymerised to entrap the organic ion-exchange reactants in the bulk of an organic polymeric support. Examples include the Levextrel resins of Bayer ("LEVEXTREL" is a registered Trade Mark). The process is, however, not susceptible of universal application to all organic ion-exchange reagents; moreover, the materials are found to have rather slow extraction kinetics and also suffer from the gradual diffusion of the organic ion-exchange reagent from the material.

This invention seeks to provide liquid extractants in which the aforementioned disadvantages are reduced or obviated.

According, therefore, to one aspect of the present invention, there is provided a process for the production of a solid, particulate immobilised extractant, which process comprises adsorbing (a) a liquid extractant which is not homopolymerisable onto (b) a porous, solid, particulate, preferably inorganic, substrate; adsorbing (c) a monomer onto the substrate; and polymerising the adsorbed monomer (c) thereby entrapping the liquid extractant (a) on substrate (b). By "immobilised extractant" is meant herein the solid, particulate product of the process of the present invention for use in extracting values, especially metal values, from liquids which are typically, but not necessarily, solvents comprising the said values in solution.

The liquid extractant (a) used in the present invention can be any organic compound, or mixture of such compounds, which comprises one or more functional groups which are effective to extract values, especially metal values, from liquids contacted therewith. Examples include the classes of organic neutral or acid esters of acids of phosphorus, especially neutral or acid phosphate esters, such as $C_1$ to $C_8$ alkyl such esters; for example, tri-butyl phosphate and di-2-ethylhexyl phosphoric acid; organic phosphine oxides; amines such as primary, secondary and tertiary amines, especially aliphatic amines; amino acids; and chelate compounds, for example, hydroxy oximes such as o-hydroxyaryl oximes. The liquid extractant (a) is not homopolymerisable; that is, does not form with itself an addition or condensation homopolymer under conventional chemical polymerisation procedures; in particular, it does not contain olefinic or acetylenic unsaturation or a 3-membered ring.

It is an important feature of the present invention that the liquid extractant is preferably a commercially available such material whose proven effectiveness is enhanced, especially its extraction kinetics, by incorporation into an immobilised extractant produced by the process of this invention.

The porous, solid, particulate substance (b) is preferably an inorganic substance, especially one comprising surface hydroxyl groups. Preferred are dried inorganic oxide gels such as silica, alumina, zirconia, titania, stannia and ferric oxide; and inorganic silicates such as natural clays and zeolites. Silica is the preferred particulate substance (b). It is particularly desirable that the porous, solid, particulate substance (b) should have a specific surface area from 200 to 1000 $m^2g^{-1}$, especially from 300 to 800 $m^2g^{-1}$. It is also desirable that the particulate substance (b) has an average pore size from 10 to 300$\mu$, preferably from 20 to 100$\mu$. It is further desirable that the average particle size of the particulate substance is from 0.1 to 0.5 mm. Suitably the particulate substance is heated, for example up to 100° C., overnight. There is a well-developed, industrial capability to produce such silica; certain natually-occurring silicas, such as diatomaceous earth, are also found to be very suitable.

The monomer (c) comprises a monovinyl compound, or mixture of such compounds; for example, substituted or unsubstituted styrenes, acrylic or methacrylic acids, acid amides, nitriles or esters; for example methyl methacrylate and acrylonitrile; and vinyl heterocyclic compunds; for example, vinylpyridine and N-vinyl pyrrolidone. It is particularly preferred, in order to minimise leaching of liquid extractant (a), to include a cross-linking agent with monomer (c) in an amount of from 30 to 100% by weight of monomer (c). Uncongugated polyvinyl compounds, for example, divinyl benzene and ethylene glycol dimethacrylate, are very suitable. The monomer (c) may itself comprise a polyvinyl comound such as divinyl benzene.

The process of the present invention is preferably effected by uniformly mixing the liquid extractant (a) with the monomer (c), preferably in admixture with a cross-linking agent. A mutual solvent may be incorporated, if desired: for example, an aliphatic hydrocarbon. This homogeneous mixture is then uniformly mixed with the porous, solid particulate substance (b). The particulate substance (b) may with advantage be subjected to a pre-irradiation prior to mixing: a dose of 5 Mrad from a $^{60}Co$ source is found to be suitable. The final mixture is then polymerised, preferably by UV, X- or $\gamma$-irradiation polymerisation, especially $\gamma$-irradiation such as that from a $^{60}Co$ source. A total dose of 20 to 40, preferably 25 to 30, Mrad at a dose rate of 0.7 to 2.0, preferably 1.0 to 1.5, Mrad $hr^{-1}$ is very suitable. It is believed, though not ascertained, that the monomer (c)

is grafted, by irradiation, onto the surface of particulate substance (b) thereby entrapping liquid extractant (a).

This invention also provides a immobilised extractant whenever prepared by the process of the present invention.

According to a further feature of this invention, there is provided a method of extracting metal values, which method comprises contacting a liquid, preferably an aqueous liquid, comprising the metal values with a immobilised extractant prepared by the process of this invention; separating the contacted immobilised extractant from the liquid; and removing the metal values, in a manner known per se, from the contacted immobilised extractant. It is preferred that the polymerised monomer (c) is not swellable in the liquid comprising the metal values.

This invention further provides metal values, especially copper or gold values, whenever extracted by the method of the present invention.

The following Examples illustrate the invention.

EXAMPLE 1

A mixture of 0.5 g of divinylbenzene; 1.5 g of styrene; and 2 g of SME-529 (a proprietary organic extractant comprising a chelating hydroxyoxime, the active component being 2-hydroxy-t-nonyl acetophenone oxime, ex Shell Chemical Company) was prepared. 8 g of dried silica gel (ex W. R. Grace) were immersed in the mixture until it was all imbibed. The liquid which remained on the surface of the gel was then removed by contacting it with filter paper. The impregnated silica gel was subsequently irradiated by exposure to a $^{60}$Co source at room temperature for 20 hours at a dose rate of 0.70 Mrad hr$^{-1}$. After irradiation, unreacted products were removed by vacuum pumping. Thereafter the irradiated impregnated silica gel was washed overnight with both hot and cold water; filtered; and dried.

EXAMPLE 2

A mixture of 0.5 g of divinylbenzene; 1.5 g of methyl methacrylate and 2 g of SME-529 was adsorbed onto 8 g of silica gel. The impregnated silica gel was then subsequently treated as in Example 1.

EXAMPLE 3

Figure 1:
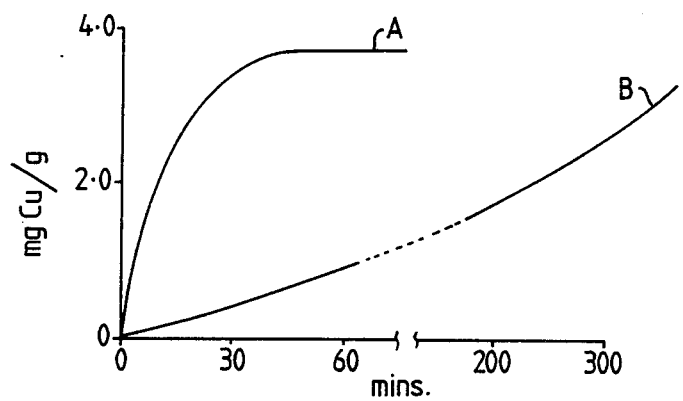
In FIG. 1, a curve A represents the equilibrium capacity of immobilized extractant and curve B shows comparative results of the same liquid extractant entrapped in the bulk of an organic polymeric support.

A series of experiments was performed by contacting, with contact times ranging from 0 (control) to 60 min 5 cm$^3$ aliquots of an aqueous copper (II) sulphate solution containing 5 gl$^{-1}$ CuSO$_4$.5H$_2$O with 0.5 g of the immobilised extractant prepared in Example 2. In each case the supernatant liquid was removed by filtration and analysed for copper concentration by atomic adsorption spectrophotometry (spectrophotometer model 1L 151). The difference between the initial and final solution copper concentration enables the immobilised extractant's capacity to be determined. FIG. 1 of the accompanying drawings is a plot of capacity, as ordinate, against contact time as abscissa. It will be seen that the equilibrium capacity of the immobilised extractant (curve A) is nearly 4 mg Cu per g of material. This is close to the theoretical capacity of this liquid extractant for copper in conventional liquid-liquid extraction applications (2.8 g.l$^{-1}$ at pH=1.93).

Curve B gives, for comparative purposes, analogous results for the same liquid extractant entrapped in the bulk of an organic polymeric support (macroporous polystyrene prepared by polymerising styrene in the presence of divinylbenzene). It is to be observed that the immobilised extractant of the present invention has superior kinetics with equilibrium capacity being attained in 30 minutes whereas the organic polymeric meterial has still not attained its equilibrium capacity after 300 minutes.

EXAMPLE 4

An immobilised extractant was prepared essentially as disclosed in Example 2 but with the liquid extractant being Acorga P50 (a proprietary product comprising 5-nonyl salicylaldoxime ex ICI-AAC). The immobilised extractant was found to have a capacity for copper of 4.50 mg Cu per g of material and a total capacity of 4.59 mg cationic species per g of material, this representing a selectivity of 49.2 (Cu/Fe). Comparative results wherein the same liquid extractant is entrapped in the bulk of an organic polymeric (polydivinyl benzene) support give a selectivity of only 18.76.

EXAMPLE 5

A mixture of 3 g of Alamine 336 (a proprietary organic extractant comprising a tri- C$_8$ to C$_{10}$ alkyl amine ex Henkel Corporation) and 3 g of divinyl benzene was prepared. 12 g of dried silica gel ("SORBSIL" ex J. Crosfield) were immersed in the mixture until it was all imbibed. The liquid which remained on the surface of the gel was then removed by contacting it with filter paper. The impregnated silica gel was subsequently irradiated by exposure to a $^{60}$Co source at room temperature for 30 hours at a dose rate of 1.4 Mrad hr$^{-1}$. After irradiation, the impregnated silica was treated as in Example 1.

0.2 g of the immobilised extractant so prepared was then contacted with 5N aqueous HCl to protonate the amino groups of the Alamine 336 and then treated with 10 ml or an aqueous gold cyanide solution containing 150 ppm Au. In essentially the same manner as in Example 3 the immobilised extractant's capacity was determined to be 11 to 14 mg Au per g of material. This compares very favourably with results obtained for activated carbon (8.9 to 12.5 mg Au per g of activated carbon).

The kinetics of the gold cyanide sorption are shown in Table 1 below.

TABLE 1

| Time (h) | Capacity mg Au g$^{-1}$ |
|---|---|
| 1 | 10.0 |
| 2 | 10.4 |
| 5 | 10.8 |
| 11 | 11.0 |

It will be seen that 90% of the gold sorption is complete after 1 hour.

Three reagents were then used to elute sorbed gold from the immobilised extractant. In each case 0.2 g material initially containing 11.0 mg Au g$^{-1}$ was contacted with 10 ml of eluent. The results are shown in Table 2.

TABLE 2

| Eluent | 0.01 N NaOH | 4 N KCSN | 2 N NH$_4$SCN |
|---|---|---|---|
| Gold concentration in eluate (mg l$^{-1}$) | 108 | 195 | 164 |

EXAMPLE 6

Figure 2:
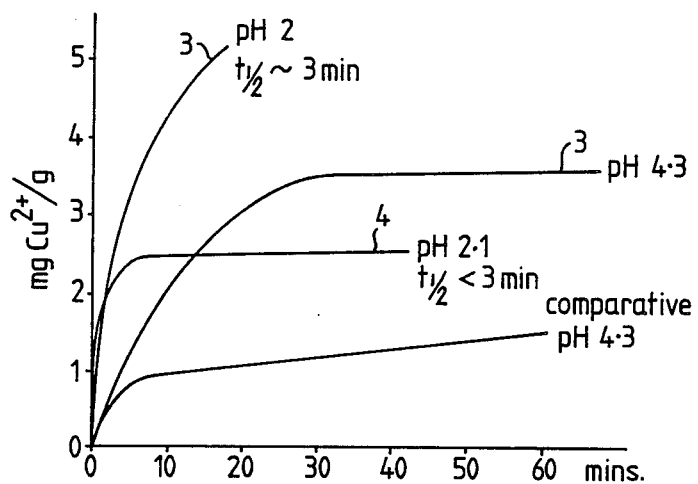
FIGS. 2 and 3 show representative examples of the kinetics of ion exchange materials.
Figure 3:
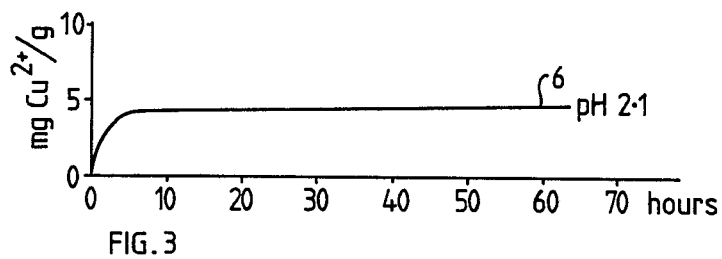

A series of immobilised extractants, detailed below in Table 3, was prepared and tested essentially as in Example 3. In Table 4 copper loadings are given while FIGS. 2 and 3 of the accompanying drawings show representative examples of the kinetics of the ion-exchange materials.

| Sample | Organic monomers | Inorganic substrate | Liquid extractant | Reagent content g liquid extractant/ g immobilised extractant | Density kg m$^{-3}$ |
|---|---|---|---|---|---|
| 1 | MMA, DVB | Silica | SME-529 | 0.27 | 542 |
| 2 | MMA, DVB | Silica | SME-529 | 0.16 | |
| 3 | MMA, DVB | Silica | Acorga P5100 | 0.16 | 926 |
| 4 | MMA, DVB | Silica | Acorga P50 | 0.06 | 680 |
| 5 | MMA, DVB | Silica | Acorga P50 | 0.07 | |
| 6 | MMA, DVB | Silica | Acorga P50 | 0.10 | 580 |
| 7 | MMA, DVB | Silica | Acorga P50 | 0.08 | 580 |
| 8 | MMA, DVB | Silica | Acorga P50 | 0.10 | 581 |
| 9 | MMA, DVB | Silica | Acorga P50 | 0.10 | 710 |
| 10 | MMA, DVB | Silica | Acorga P50 | 0.10 | 874 |
| 11 | MMA, DVB | Silica | Acorga P50 | 0.10 | 725 |
| 12 | MMA, DVB | Silica | Acorga P50 | 0.10 | 517 |
| 13 | MMA, DVB | Silica | Acorga P50 | 0.10 | 658 |

TABLE 4

| Sample | Loading per g immobilised extractant mg Cu g$^{-1}$ | Loading per g liquid extractant mg Cu g$^{-1}$ |
|---|---|---|
| 7 | 4.400 | 55.0 |
| 6 | 4.010 | 40.1 |
| 4 | 2.300 | 38.3 |
| 13 | 3.738 | 37.4 |
| 8 | 3.250 | 32.5 |
| 5 | 2.200 | 31.4 |
| 3 | 3.630 | 22.7 |
| 2 | 3.065 | 19.2 |
| 1 | 3.410 | 12.6 |

All of the loadings in the final column are higher than that attained with the free liquid extractant (as Acorga P5100 in Escaid 100) which is only 8.7. The Figures show excellent kinetics.

EXAMPLE 7

A mixture of 5 g of acrylamide; 12 g of di-2-ethylhexyl phosphoric acid; 5 g of acrylic acid; and 2 g of divinylbenzene was prepared with stirring. 48 g of dried silica gel were immersed in the mixture until it was all imbibed. The impregnated silica gel was thereafter treated as in Example 1.

EXAMPLE 8

An immobilised extractant was prepared essentially as described in Example 4 but with tributylphosphate as liquid extractant.

EXAMPLE 9

An immobilised extractant was prepared essentially as described in Example 4 but with trioctylphosphine oxide as liquid extractant.

The chemical reactivity of the immobilised extractants of the invention is impressive, especially for the recovery of copper and gold from aqueous solutions. Copper loading with chelating hydroxyoxime reagents (for example, Acorga P50 or Shell SME-529) gives capacities as high as 18.5 mg $Cu^{2+}$ per g immobilised extractant. This is a high value and exceeds the loading obtained with a homogeneous mixture of the liquid extractant and inert diluent. The kinetics of sorption is fast; sorption is complete in 10 minutes or less. The selectivity of $Cu^{2+}/Fe^{3+}$ is good and values of 85 were recorded at solution concentrations of 0.5 g/l of each ion in solution. The recovery of gold from aqueous gold cyanide solutions is particularly interesting, since there is much commercial interest in this separation process, especially at low concentration. Gold sorption with immobilised extractants comprising Alamine 336 loaded silica gel is acceptable (up to about 10 g Au per g of immobilised extractant and the reaction is complete in about 1 minute. The gold is readily eluted with dilute sodium hydroxide. The rapid kinetics is a very important advantage since polymeric resins require longer and activated carbon requires several hours to come to equilibrium and also requires a more complex elution reaction.

We claim:

1. A process for the production of a solid, particulate immobilised extractant, which process comprises adsorbing (a) a liquid extractant which is not homopolymerisable onto (b) a porous, solid, particulate, substrate; adsorbing (c) a monomer onto the substrate; and polymerising the adsorbed monomer (c) by subjecting the monomer (c) to irradiation, thereby entrapping the liquid extractant (a) on substrate (b).

2. A process according to claim 1 wherein the particulate substrate (b) is an inorganic particulate substrate.

3. A process according to claim 1 wherein the partculate substrate (b) has a specific surface area from 100 to 800 m$^2$g$^{-1}$.

4. A process according to claim 3 wherein the specific surface area is from 400 to 600 m$^2$g$^{-1}$.

5. A process according to claim 1 wherein the average pore diameter is from 10 to 300$\mu$.

6. A process according to claim 5 wherein the average pore diameter is from 20 to 100$\mu$.

7. A process according to claim 1, wherein the substrate (b) is subjected to pre-irradiation prior to adsorbing the monomer.

8. A process according to claim 7 wherein the surface of the particulate substrate (b) comprises hydroxyl groups.

9. A process according to claim 1 wherein the monomer (c) comprises a cross-linking monomer.

10. A process according to claim 1 wherein the polymerisiation is effected by subjecting the monomer (c) to UV, X or $\gamma$-irradiation.

11. A process according to claim 10 wherein the total dose of radiation is from 20 to 40 Mrad.

12. A process for the production of a solid, particulate immobilized extractant, which comprises adsorbing (a)

a liquid extractant which is not homopolymerizable selected from the group consisting of organic neutral or acid esters of phosphorous, organic phosphine oxides, amines, amino acids and chelate compounds onto (b) a porous, solid particulate inorganic substrate; adsorbing (c) a monomer selected from the group consisting of monovinyl compounds and mixtures thereof onto the substrate; and polymerizing the adsorbed monomer (c) by subjecting the monomer (c) to irradiation, thereby entrapping the liquid extractant (a) on substrate (b).

13. A process according to claim 12, wherein said substrate (b) is a dried inorganic gel or an inorganic silicate.

14. An immobilised extractant whenever prepared by the process of claim 12.

* * * * *

Disclaimer 4,711,863.—*Michael Streat*, Wembley, England; *Sophia Belfer–Canterman*, Beer-Sheva, Israel. IMMOBILISHED EXTRACTANTS. Patent dated Dec. 8, 1987. Disclaimer filed May 8, 1989, by the assignee, National Research Development Corp.

Hereby enters this disclaimer to claims 5 and 6 of said patent.

[ *Official Gazette September* 12, 1989 ]